US009244370B2

(12) United States Patent
Chun et al.

(10) Patent No.: US 9,244,370 B2
(45) Date of Patent: Jan. 26, 2016

(54) POLYMER-ENCAPSULATED METALLIC INK PARTICLES AND METALLIC ELECTROPHOTOGRAPHIC INKS

(75) Inventors: Doris Chun, Santa Clara, CA (US); Hou T. Ng, Campbell, CA (US); Albert Teishev, Rishon le-zion (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 90 days.

(21) Appl. No.: 14/369,174

(22) PCT Filed: Jan. 5, 2012

(86) PCT No.: PCT/US2012/020309
§ 371 (c)(1),
(2), (4) Date: Jun. 26, 2014

(87) PCT Pub. No.: WO2013/103346
PCT Pub. Date: Jul. 11, 2013

(65) Prior Publication Data
US 2014/0342279 A1 Nov. 20, 2014

(51) Int. Cl.
G03G 9/08 (2006.01)
C09D 11/037 (2014.01)
C09D 11/106 (2014.01)
G03G 9/09 (2006.01)
G03G 9/12 (2006.01)
G03G 9/13 (2006.01)

(52) U.S. Cl.
CPC ............ *G03G 9/0825* (2013.01); *C09D 11/037* (2013.01); *C09D 11/106* (2013.01); *G03G 9/0802* (2013.01); *G03G 9/0902* (2013.01); *G03G 9/122* (2013.01); *G03G 9/13* (2013.01); *G03G 9/131* (2013.01)

(58) Field of Classification Search
CPC ............................... G03G 9/122; G03G 9/131
USPC ......................................................... 430/115
See application file for complete search history.

(56) References Cited

U.S. PATENT DOCUMENTS

| 5,206,108 | A | 4/1993 | Felder et al. |
| 6,376,147 | B1 | 4/2002 | Bonsignore |
| 7,488,562 | B2 | 2/2009 | Daimon et al. |
| 8,530,049 | B2 | 9/2013 | Setoguchi et al. |
| 2006/0222985 | A1 | 10/2006 | Tsubuko et al. |
| 2008/0163789 | A1 | 7/2008 | Silcoff et al. |
| 2009/0111040 | A1 | 4/2009 | Veregin |
| 2011/0123228 | A1 | 5/2011 | Roditi et al. |

(Continued)

FOREIGN PATENT DOCUMENTS

| CN | 1986648 | 6/2007 |
| CN | 102056999 | 5/2011 |

(Continued)

OTHER PUBLICATIONS

Banerjee et al., "Laser Printing of Polymeric Materials", Rapid Prototyping & Manufacturing Group, Faculty of Computing Sci. and Eng., DeMontfort Univ., Leicester, UK, pp. 1-9.

*Primary Examiner* — Mark A Chapman
(74) *Attorney, Agent, or Firm* — Dierker & Associates, P.C.

(57) ABSTRACT

A method for making polymer-encapsulated metallic ink particles is disclosed herein. An ethylene-based polymeric resin powder is formed, and is mixed with a metallic pigment powder to form a powder mixture. The powder mixture is melted to form a metallic polymer melt. A non-polar carrier is added to the metallic polymer melt to form a slurry. The slurry is processed in a microfluidizer.

15 Claims, 3 Drawing Sheets

(56) References Cited

U.S. PATENT DOCUMENTS

2011/0171571 A1 7/2011 Kim
2011/0217650 A1 9/2011 Mor et al.
2011/0262654 A1 10/2011 Yates et al.

FOREIGN PATENT DOCUMENTS

| CN | 102159652 | 8/2011 |
| CN | 102203196 | 9/2011 |
| EP | 0284034 | 10/2006 |
| WO | WO 2009/070148 | 6/2009 |
| WO | WO 2011/009488 | 1/2011 |

POLYMER-ENCAPSULATED METALLIC INK PARTICLES AND METALLIC ELECTROPHOTOGRAPHIC INKS

BACKGROUND

The present disclosure relates generally to polymer-encapsulated metallic ink particles and metallic electrophotographic inks.

The global print market is in the process of transforming from analog printing to digital printing. Electrophotographic printing is one example of a digital printing technique. Electrophotographic printing refers to a process that provides an ink image that is electrostatically transferred from a photo imaging plate to an intermediate drum or roller, and then is thermally transferred to a substrate; or to a process where the ink image is electrostatically transferred from the photo imaging plate directly onto a substrate. In one example, the photo imaging plate is a photoconductive surface that is used to develop a hardcopy of the image. The photoconductive surface is selectively charged with a latent electrostatic image having both image and background areas. In one example, a liquid ink, which includes charged toner particles in a carrier liquid, is brought into contact with the selectively charged photoconductive surface. The charged toner particles adhere to the image areas of the latent image while the background areas remain free of ink. A hardcopy material (e.g., paper or other print substrate) is brought directly or indirectly into contact with the photo-conductive surface in order to transfer the latent image. Variations of electrophotographic printing utilize different methods for forming the electrostatic latent image on a photoreceptor or on a dielectric material. Inks used in electrophotographic printing include solid color inks, clear inks, and metallic inks.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Examples of the method disclosed herein generate polymer-encapsulated (i.e., polymer-bound) metallic ink particles that are suitable for use in LEP inks and printing processes. The processes disclosed herein produce micron-sized metallic pigments that are passivated or tethered with ethylene-based resin polymers. The polymer encapsulation of the metallic pigments that results from the method(s) disclosed herein is believed to minimize the extent of exposed metallic pigment surfaces. The minimization of exposed metallic pigment surfaces, in turn, is believed to minimize or prevent the occurrence of the pigments coming into direct contact with i) a conductive squeegee roller in a binary ink developing unit of an LEP print engine, and ii) charged regions on a photoconductor of the LEP print engine. The minimization or avoidance of such direct contact allows the selective electrostatic transfer of the encapsulated metallic pigment particles during the LEP printing process. Exposed metallic pigment surfaces are believed to provide a conductive path in the non-polar carrier of the ink, which neutralizes the potential between two charged surfaces and causes undesirable development of the metallic pigment particles (which leads to an undesirably high flop index and optical density in the background of a print). Using the method(s) disclosed herein, the discharging of metallic inks is suppressed and the transfer of metallic pigments to the background of a print is substantially avoided. This enables the LEP digital press to be operated at optimal conditions while also achieving a print that has a relatively low (<1) flop index and relatively low metallic ink in the background.

Flop index is the measure of the change in lightness of a metallic color as it is tilted through the entire range of viewing angles. Methods for measuring flop index include, for example, illuminating the printed ink containing metallic pigments under $\beta=45°$ and measuring the lightness $L^*(\mu_{as})$, for example, at three aspecular angles $\mu_{as}=15°, 45°$, and $110°$. An equation for calculating flop index (FI) is shown as follows:

$$FI = 2.69 \cdot \frac{[L*(\mu_{as} = 15°) - L*(\mu_{as} = 110°)]^{1.11}}{[L*(\mu_{as} = 45°)]^{0.85}}.$$

Figure 1:
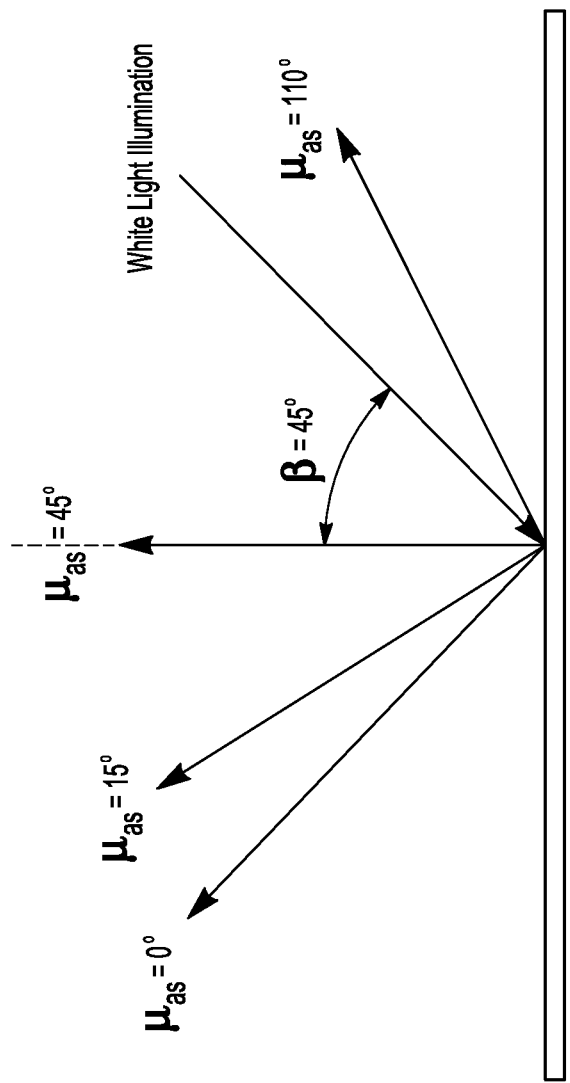
FIG. 1 is a graph illustrating an illumination angle and aspecular angles used to measure a flop index of a print including metallic pigments.

FIG. 1 illustrates an x-y plane and the illumination angle ($\beta=45°$ measured with respect to the x-y plane. FIG. 1 also illustrates the aspecular angles ($\mu_{as}$) of the illumination angle that are equal to $15°, 45°$, and $110°$. Each of these angles is measured from the angle identified as $\mu_{as}=0°$, which is the aspecular measuring angle of the illumination angle.

Additionally, in the presence of a charging agent and an electric field, the polymer-encapsulated metallic pigments exhibit mobility in dielectric media. As such, the inks including the polymer-encapsulated metallic pigments may be suitable for use in other applications, such as displays.

Figure 2:
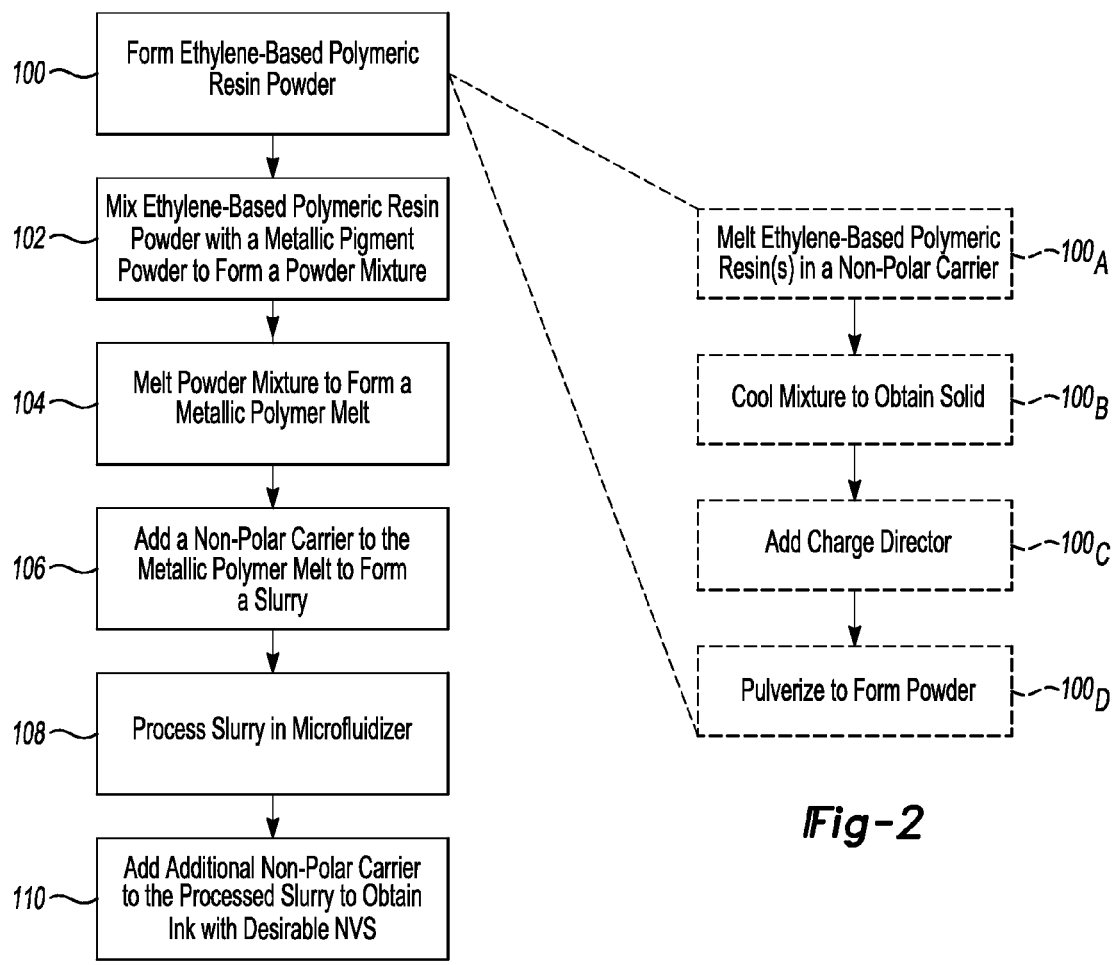
FIG. 2 is a flow diagram illustrating examples of a method for making polymer-encapsulated metallic ink particles.

Referring now to FIG. 2, an example of a method for forming polymer-encapsulated metallic ink particles is shown. FIG. 2 also illustrates the formation of a liquid electrophotographic ink including the polymer-encapsulated metallic ink particles.

As shown at reference numeral 100, an ethylene-based polymeric resin powder is formed. Reference numerals 100$_A$ through 100$_D$ illustrate the various steps that are performed when making the ethylene-based polymeric resin powder.

At the outset, an ethylene-based polymeric resin may be selected. Examples of suitable ethylene-based polymeric resins include co-polymers of ethylene, methacrylic acid and acrylic acid, co-polymers of ethylene and an acrylate, co-polymers of ethylene and vinyl acetate, or various combinations of these co-polymers. When co-polymers of ethylene and an acrylate are utilized, the acrylate may be a butyl-acrylate, an ethyl-acrylate, a methyl-acrylate, or combinations thereof. Some commercially available examples of co-polymers of ethylene and an acrylate include ELVALOY®

AC resins from E. I. du Pont de Nemours and Company. Some commercially available examples of co-polymers of ethylene and vinyl acetate include ELVAX® resins and BYNEL® resins from E. I. du Pont de Nemours and Company. Still other suitable resins include the NUCREL® resins from E. I. du Pont de Nemours and Company, and the A-C®, ACLYN® and ACUMIST® resins from Honeywell.

The amount of the ethylene-based polymeric resin that may be used depends, at least in part, upon how much powder is to be made and how much of the resin is to be included in the final ink. In an example, the final ink may include the ethylene-based polymeric resin in an amount ranging from about 50 wt % to about 95 wt % with respect to the total non-volatile solids (NVS) content of the ink. In another example, the final ink may include the ethylene-based polymeric resin in an amount ranging from about 60 wt % to about 75 wt % with respect to the total non-volatile solids content of the ink.

The selected ethylene-based polymeric resin may be suspended in a non-polar carrier. The non-polar carrier that is selected to form the ethylene-based polymeric resin powder may also be the same non-polar carrier that is used throughout the process (e.g., to form the slurry and to form the final ink). Generally, the non-polar carrier has properties such as low odor, lack of color, selective solvency, oxidation stability, low electrical conductivity, low surface tension, desirable wetting, spreadability, low viscosity, narrow boiling point range, non-corrosive to metals, low freezing point, high electrical resistivity, high interfacial tension, low latent heat of vaporization, and low photochemical reactivity.

Examples of non-polar carriers include dielectric liquids, non-oxidative water immiscible liquids (e.g., petroleum distillates), hydrocarbon-based carriers (e.g., aliphatic—i.e., linearacyclic or cyclic—hydrocarbons, branched-chain aliphatic hydrocarbons, etc.), silicone oil, soy bean oil, vegetable oil, plant extracts, etc. In one example, the non-polar carrier is an alkane or a cycloalkane having from 6 to 14 carbon atoms (e.g., n-hexanes, heptanes, octane, dodecane, cyclohexane etc.), t-butylbenzene, or 2,2,4-trimethylpentane. In another example, the non-polar carrier is selected from paraffins and isoparaffins. Examples of isoparaffins include those in the ISOPAR® family (Exxon Mobil Corp.), including ISOPAR® G, ISOPAR® H, ISOPAR® K, ISOPAR® L, and ISOPAR® M. Other hydrocarbons that may be used as the non-polar carrier include those bearing the trade name SOLTROL® (available from Chevron Phillips Chemical Company) or SHELLSOL® (available from Shell Chemicals). Any of the listed non-polar carriers may be used alone, or a combination of two or more of the listed non-polar carrier liquid may also be used. The amount of non-polar carrier added may range anywhere from about 60% to about 80% with respect to the total non-volatile solids of polymer resin(s).

The ethylene-based polymeric resin(s) and the non-polar carrier may be stirred, and the temperature may be raised to at least the melting temperature of the resin(s). This melts the resin(s) in the non-polar carrier, as shown at reference numeral $100_A$. Heating and stirring may be continued until a substantially homogeneous (as observed by the human eye), viscous mixture is obtained. In an example, the substantially homogeneous, viscous mixture has about 40% solids by weight.

The substantially homogeneous, viscous mixture may be cooled slowly to obtain a solid, as shown at reference numeral $100_B$. This cooling step may be accomplished with or without stirring. When stirring is utilized, the speed of stirring may be equal to or less than 10 rpm. In an example, cooling may take place in an oil bath. Generally, cooling is performed until the mixture becomes a solid. In some instances, the mixture may reach room temperature (e.g., from about 18° C. to about 22° C.).

As shown at reference numeral $100_C$, a charge director (i.e., a charge/charging agent) may be added to the solid. It is to be understood that additional charge director may be added in the press prior to printing. The charge director may be any oil soluble low molecular weight (i.e., less than 1000 amu) molecule or oligomer that contains a charge. The charge director may be positively charged, negatively charged, or may be a zwitterion (i.e., a neutral molecule with a positive charge and a negative charge at different locations). The charge(s) may be due to the presence of a specific functional group, such as a sulfonate, sulfate, amide, carbonate, phosphate, phosphonate, nitrate, boronate, etc.

In the final ink, the charge director attaches to/associates with and imparts a charge to the encapsulated metallic pigment particles. Examples of suitable charge directors include lecithin, oil-soluble petroleum sulfonates (e.g., neutral calcium petronate, neutral barium petronate, and basic barium petronate), polybutylene succinimides (e.g., OLOA 1200), glyceride salts (e.g., sodium salts of phosphated mono- and diglycerides with unsaturated and saturated acid substituents), sulfonic acid salts (e.g., barium, sodium, calcium, and aluminum salts of sulfonic acid), oxyphosphate metal salts, or mixtures/combinations thereof. The sulfonic acids may include alkyl sulfonic acids (e.g., alkyl-benzenesulfonic acid), aryl sulfonic acids, sulfonic acids of alkyl succinates, and mixtures/combinations thereof. The amount of charge director will depend, at least in part, upon the low field and high field conductivities of the final ink. In an example, the charge director may be added in an amount ranging from about 1 mg/g of non-volatile solids present in the final ink to about 10 mg/g of solids non-volatile present in the final ink. In another example, the charge director may be added in an amount ranging from about 2 mg/g of non-volatile solids present in the final ink to about 5 mg/g of non-volatile solids present in the final ink.

The solid and the charge director may be pulverized to form the ethylene-based polymeric resin powder, as shown at reference numeral $100_D$. Pulverizing may be accomplished until a fine powder (as observer by the human eye) is obtained. Each particle of the fine powder has a size that is less than 50 µm. In an example, the particles of the fine powder have a size ranging from about 5 µm to about 20 µm. Any suitable equipment may be used to pulverize, including, for example, pulverizers, jet pulverizers, mechanical or jet mills, or the like.

A powder mixture may then be formed by mixing the ethylene-based polymeric resin powder with a metallic pigment powder, as shown at reference numeral 102. The metallic pigment powder may include particles in the form of regularly or non-regularly shaped spheres, flakes, etc. Examples of metallic pigments include aluminum flakes, aluminum silver dollars, metal oxide pigments (e.g., titanium dioxide pigments, iron oxide flakes, etc.), composite metallic pigments (e.g., metallic oxide coated metallic pigments, silicon oxide coated metallic pigments, or the like), or combinations thereof.

When forming the powder mixture, the ratio of metallic pigment powder to ethylene-based polymeric resin powder ranges from about 1:5 to about 1:1.

The amount of the metallic pigment powder that may be used also depends, at least in part, upon the total non-volatile solids content of the ink that is to be formed. In an example, the final ink may include the metallic pigments in an amount ranging from about 5 wt % to about 50 wt % with respect to the total non-volatile solids content of the ink. In another example, the final ink may include the metallic pigments in an amount ranging from about 15 wt % to about 40 wt % with respect to the total solids content of the ink.

Mixing the ethylene-based polymeric resin powder with the metallic pigment powder may be accomplished via a bead milling tool or a mechanical mixing tool. The powders may be mixed until a substantially uniform (as observed by the human eye) mixture is obtained.

The powder mixture may then be exposed to an increased temperature in order to melt the powder mixture and form a metallic polymer melt, as shown at reference numeral 104. The temperature for this melting step will depend, at least in part, on the ethylene-based polymeric resin powder and the metallic pigment powder that are utilized. In an example, the temperature may range from about 110° C. to about 120° C. Stirring (i.e., using the bead milling tool or the mechanical mixing tool) may be performed as the metallic polymer melt is formed. In an example, stirring may be accomplished at the increased temperature for a time ranging from about 15 minutes to about 60 minutes.

As shown at reference numeral 106, a non-polar carrier may be added to the metallic polymer melt. The non-polar carrier that is added may be the same non-polar carrier used to form the ethylene-based polymeric resin powder. As the non-polar carrier is added, stirring may be continued at the increased temperature. This enables a substantially homogeneous (as observed by the human eye) dispersion or slurry to be formed. In an example, the non-polar carrier is added while the metallic polymer melt is maintained at a temperature ranging from about 110° C. to about 120° C. and is stirred at a speed ranging from about 100 rpm to about 500 rpm for a time ranging from about 15 minutes to about 60 minutes. The heat may be removed while stirring continues. In an example, the stirring may be continued until the slurry reaches a temperature that is equal to or less than 35° C. The amount of time that stirring continues after the heat is removed may vary depending, at least in part, on the volume of materials used.

It is to be understood that the addition of the non-polar carrier at step 106 may take place in the same bead milling tool or mechanical mixing tool that is used to form the metallic polymer melt.

Referring now to reference numeral 108, the slurry may be processed in a microfluidizer. An example of a suitable microfluidizer includes an M-110Y microfluidizer (having an 87 micron Z-chamber). The slurry may be processed in the microfluidizer at a temperature ranging from about 0° C. to about 10° C. and for a time ranging from about 30 minutes to about 90 minutes.

Figure 3A:
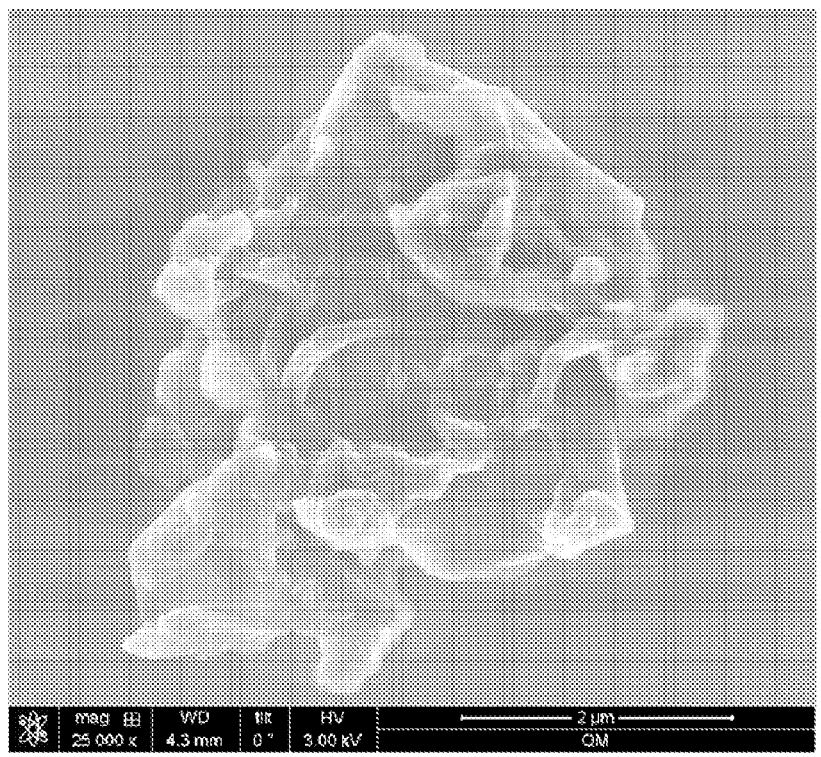
FIGS. 3A and 3B are scanning electron micrograph images (at 25000× and 7500× magnification, respectively) of polymer-encapsulated metallic liquid electrophotographic (LEP) ink particles that are formed via examples of the method disclosed herein.
Figure 3B:
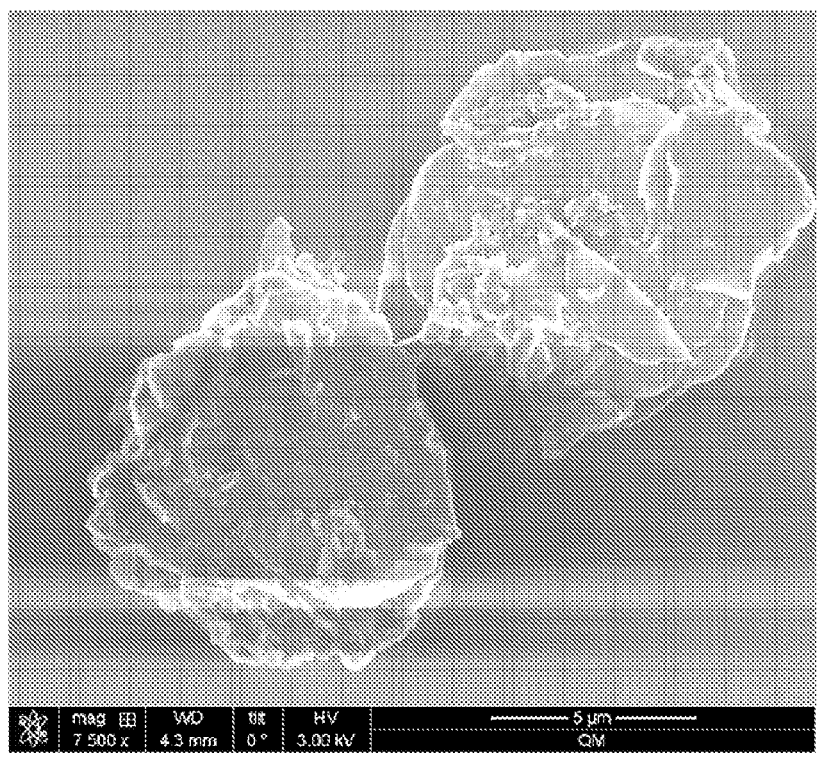

Microfluidization results in the formation of an ink paste which includes the polymer-encapsulated metallic ink particles. Two examples of the polymer-encapsulated metallic ink particles formed via examples of the process disclosed herein are shown in FIGS. 3A and 3B. The example in FIG. 3A illustrates a fully encapsulated metallic ink particle, and the example shown in FIG. 3B illustrates encapsulated metallic ink particles with different degrees of encapsulation. The polymer-encapsulated metallic ink particles that are formed have a size ranging from about 2 μm to about 20 μm. In an example, the size of the polymer-encapsulated metallic ink particles ranges from about 5 μm to about 15 μm. As illustrated in FIGS. 3A and 3B, these particles are non-porous.

In order to make the final printable ink, additional non-polar carrier may be added to the processed slurry (i.e., the ink paste including the polymer-encapsulated metallic ink particles). This is shown at reference numeral 110 of FIG. 2. The amount of non-polar carrier that is added may depend, at least in part, on the desired total non-volatile solids for the final ink. In an example, the ink paste is diluted to about 1% to about 3% NVS for printing.

The metallic electrophotographic ink (i.e., the final printable ink) that is formed includes the non-polar carrier and the non-porous polymer-encapsulated metallic ink particles present in the non-polar carrier. Examples of the non-porous polymer-encapsulated metallic ink particles include metallic pigments in an amount ranging from about 5 wt % of total non-volatile solids in the ink to about 50 wt % of the total non-volatile solids; the ethylene-based copolymeric resin (which is associated with the surface of each of the metallic pigments) in an amount ranging from about 50 wt % of the total non-volatile solids to about 95 wt % of the total non-volatile solids; and the charge director associated with the surface of each of the metallic pigments.

The ink may be printed, for example, using any suitable liquid electrophotographic printer on any suitable medium to form a print. It is believed that the print may be formed using optimal printing conditions (for a particular printer) without generating prints with high flop indexes in the background. Rather, the prints formed using the inks disclosed herein including the polymer-encapsulated metallic ink particles disclosed herein are believed to have a background flop index equal to or less than 1, and in some instances equal to or less than 0.5.

To further illustrate the present disclosure, an example is given herein. It is to be understood that this example is provided for illustrative purposes and is not to be construed as limiting the scope of the disclosed example(s).

EXAMPLE

Ethylene-based polymeric resins (total of 80 g of ethylene/methacrylic acid copolymer NUCREL® 960 and 699) were suspended in 120 g ISOPAR® L in a heat-proof container and brought to the melting temperature of the resin under constant stirring until a homogenous, viscous mixture was obtained (~40% solids by weight). The mixture was cooled slowly in an oil bath to room temperature to form a white solid. A charge director (commercially available HP imaging agent, 0.1% to 10% of solid mass) was added to the solid, and then the mixture was pulverized into fine white powder.

The white powder was then stirred together with a pigment powder (Eckart PC3D pigment, 15% to 50% of solid mass) to form a uniform powder mixture. This mixture was melted at a temperature ranging from about 110° C. to about 120° C. with constant stirring. The result was a metallic polymer melt. After stirring at the melting temperature for about 15 minutes to about 60 minutes, additional ISOPAR® L (about 200 g) was introduced. Stirring was continued at a speed ranging from about 100 rpm to about 500 rpm and at a temperature ranging from about 110° C. to about 120° C. for about 15 minutes to about 60 minutes until a homogenous dispersion (slurry) was obtained. The heat was removed, but stirring was continued.

The slurry was processed directly in the microfluidizer (Microfluidics 110Y, 87 micron Z-chamber) at a temperature ranging from about 0° C. to about 10° C. for about 30 minutes to about 90 minutes to form an ink paste.

The ink paste was diluted to 2% NVS using ISOPAR® L.

The resulting encapsulated pigments had varying degrees of encapsulation (similar to those shown in FIG. 3B).

Figure 4:
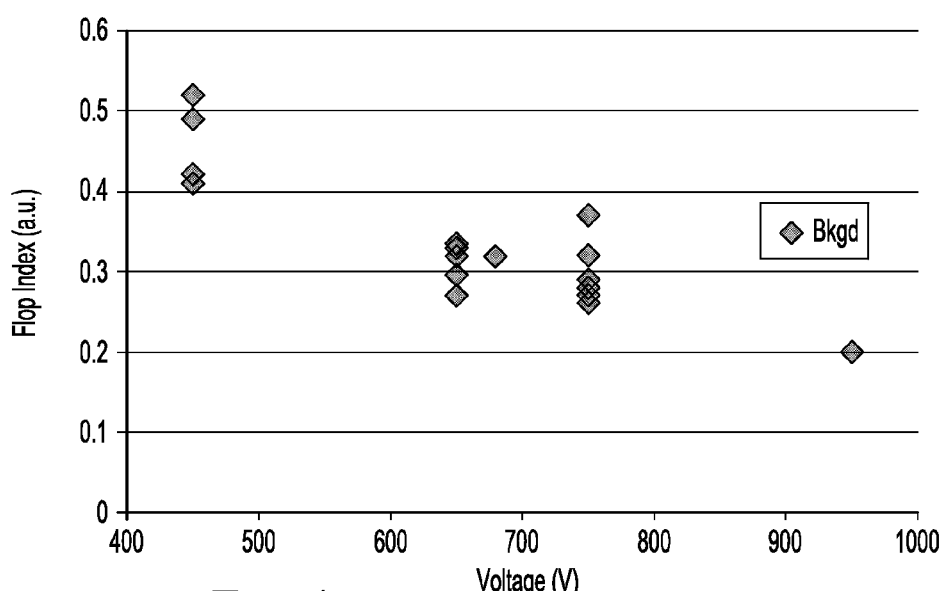
FIG. 4 is a graph plotting the background flop index of prints generated with an example of the metallic electrophotographic ink disclosed herein versus developer voltage used to print the ink.

The ink was printed using Indigo digital presses 3000 and 5500. The background flop index was plotted against the developer voltage of the presses. The results are shown in FIG. 4. In general, the flop index for all of the prints fell below 0.55. The results shown in FIG. 4 suggest a strong correlation between print quality (in terms of flop index) and developer voltage. In particular, when varying degrees of encapsulation are present, the flop indices of the prints seem to decrease with increasing developer voltage. However, it has been found that this correlation is not consistent, for example, when fully encapsulated pigments are generated using the method(s) disclosed herein. While the results are not shown herein, the flop indices remained below 0.5 but did not scale with developer voltage. Whether or not a correlation exists between flop index and developer voltage, the results of the Example provided herein generate polymer encapsulated pigments that reduce the background flop index of the generated prints.

It is to be understood that the ranges provided herein include the stated range and any value or sub-range within the stated range. For example, a range from about 5 wt % to about 50 wt % should be interpreted to include not only the explicitly recited limits of about 5 wt % to about 50 wt %, but also to include individual values, such as 6 wt %, 25 wt %, 40 wt %, etc., and sub-ranges, such as from about 15 wt % to about 40 wt %, from about 25 wt % to about 35 wt %, etc. Furthermore, when "about" is utilized to describe a value, this is meant to encompass minor variations (up to +/−10%) from the stated value.

While several examples have been described in detail, it will be apparent to those skilled in the art that the disclosed examples may be modified. Therefore, the foregoing description is to be considered non-limiting.

What is claimed is:

1. A method for making polymer-encapsulated metallic ink particles, comprising:
    forming an ethylene-based polymeric resin powder;
    mixing the ethylene-based polymeric resin powder with a metallic pigment powder to form a powder mixture;
    melting the powder mixture to form a metallic polymer melt;
    adding a non-polar carrier to the metallic polymer melt to form a slurry; and
    processing the slurry in a microfluidizer.

2. The method as defined in claim 1 wherein forming the ethylene-based polymeric resin powder includes:
    melting an ethylene-based polymeric resin in an other non-polar carrier to obtain a mixture;
    cooling the mixture to form a solid; and
    pulverizing the solid to form the ethylene-based polymeric resin powder.

3. The method as defined in claim 2, further comprising adding a charge director to the solid prior to pulverizing the solid.

4. The method as defined in claim 2 wherein the cooling of the mixture is accomplishing while the mixture is stirred.

5. The method as defined in claim 1 wherein the mixing of the ethylene-based polymeric resin powder with the metallic pigment powder to form the powder mixture is accomplished via a bead milling tool or a mechanical mixing tool.

6. The method as defined in claim 1 wherein the melting of the powder mixture takes place at a temperature ranging from about 110° C. to about 120° C.

7. The method as defined in claim 6, further comprising stirring the powder mixture while melting.

8. The method as defined in claim 1 wherein prior to processing the slurry in the microfluidizer, the method further comprises:
    as the non-polar carrier is added, stirring the metallic polymer melt and the non-polar carrier while exposing the metallic polymer melt and the non-polar carrier to heat;
    after the non-polar carrier is added, continuing the stirring while exposing the metallic polymer melt and the non-polar carrier to heat;
    removing the heat; and
    continuing the stirring after the heat is removed.

9. The method as defined in claim 8 wherein:
    the heat is at a temperature ranging from about 110° C. to about 120° C.;
    the stirring steps take place at a speed ranging from about 100 rpm to about 500 rpm; and
    each stirring step ranges from about 15 minutes to about 60 minutes.

10. The method as defined in claim 1 wherein the processing of the slurry in the microfluidizer occurs at a temperature ranging from about 0° C. to about 10° C. and for a time ranging from about 30 minutes to about 90 minutes.

11. A metallic electrophotographic ink, comprising:
    a non-polar carrier; and
    non-porous polymer-encapsulated metallic ink particles present in the non-polar carrier, the non-porous polymer-encapsulated metallic ink particles including:
        metallic pigments present in an amount ranging from about 5 wt % of total non-volatile solids to about 50 wt % of total non-volatile solids;
        an ethylene-based copolymeric resin associated with a surface of each of the metallic pigments, the ethylene-based copolymeric resin present in an amount ranging from about 50 wt % of total non-volatile solids to about 95 wt % of total non-volatile solids; and
        a charge director associated with the surface of each of the metallic pigments;
    each of the non-porous polymer-encapsulated metallic ink particles having a particle size ranging from about 2 µm to about 20 µm.

12. The metallic electrophotographic ink as defined in claim 11 wherein:
    the metallic pigments are selected from aluminum flakes, aluminum silver dollars, metal oxide pigments, composite metallic pigments, or combinations thereof; and
    the ethylene-based copolymeric resin is a copolymer of ethylene, methacrylic acid and acrylic acid.

13. The metallic electrophotographic ink as defined in claim 11 wherein a print to be formed with the ink has a flop index of equal to or less than 1.

14. The metallic electrophotographic ink as defined in claim 11 wherein the ethylene-based copolymeric resin is associated with the surface of the metallic pigments such that metallic pigment interaction with i) a conductive squeeze roller in an electrophotographic printer and ii) a charged region on a photoconductor in the electrophotographic printer is to be reduced or eliminated during printing of the ink.

15. The metallic electrophotographic ink as defined in claim 11 wherein the polymer-encapsulated metallic ink particles are formed by:
    forming a powder of the ethylene-based copolymeric resin;
    mixing the ethylene-based copolymeric resin powder with a powder form of the metallic pigments to form a powder mixture;
    melting the powder mixture to form a metallic polymer melt;
    adding some of the non-polar carrier to the metallic polymer melt to form a slurry; and
    processing the slurry in a microfluidizer to form the polymer-encapsulated metallic ink particles.

* * * * *